United States Patent
Gritti

(10) Patent No.: US 12,551,858 B2
(45) Date of Patent: Feb. 17, 2026

(54) PASSIVE SOLVENT MIXER FOR LIQUID CHROMATOGRAPHY

(71) Applicant: Waters Technologies Corporation, Milford, MA (US)

(72) Inventor: Fabrice Gritti, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 724 days.

(21) Appl. No.: 17/752,049

(22) Filed: May 24, 2022

(65) Prior Publication Data

US 2022/0410093 A1 Dec. 29, 2022

Related U.S. Application Data

(60) Provisional application No. 63/213,890, filed on Jun. 23, 2021.

(51) Int. Cl.
*B01F 25/00* (2022.01)
*B01F 25/433* (2022.01)
(Continued)

(52) U.S. Cl.
CPC ......... *B01F 25/4331* (2022.01); *G01N 30/02* (2013.01); *B01F 2101/2204* (2022.01); *G01N 2030/027* (2013.01)

(58) Field of Classification Search
CPC ......... B01F 25/4331; B01F 2101/2204; G01N 2030/347
See application file for complete search history.

(56) References Cited

U.S. PATENT DOCUMENTS 3,595,531 A 7/1971 Williams et al.
3,830,369 A 8/1974 Pfadenhauer
(Continued)

FOREIGN PATENT DOCUMENTS

CN 203061073 U 7/2013
CN 203385703 U 1/2014
(Continued)

OTHER PUBLICATIONS

Notice of Allowance in U.S. Appl. No. 17/358,360 mailed on Sep. 20, 2023.
(Continued)

*Primary Examiner* — Anshu Bhatia
(74) *Attorney, Agent, or Firm* — Schmeiser, Olsen & Watts LLP; William G. Guerin, Esq.

(57) ABSTRACT

Described is a mixer for a liquid chromatography system. The mixer includes an inlet, an outlet, a first flow channel, and a second flow channel. The inlet receives a fluid flow to be mixed and the outlet provides the mixed fluid flow. Each of the two flow channels is coupled between the inlet and the outlet. The second flow channel includes an offset volume that delays fluid propagation through the second flow channel relative to the first flow channel. The offset volume includes a coiled channel which increases radial dispersion and decreases axial dispersion of a fluid flowing through the offset volume, thereby enabling a further reduction in periodic noise in a detector baseline signal as compared to known split flow mixers for liquid chromatography systems.

13 Claims, 14 Drawing Sheets

(51) Int. Cl.
  *G01N 30/02* (2006.01)
  *B01F 101/00* (2022.01)

(56) References Cited

U.S. PATENT DOCUMENTS

| | | |
|---|---|---|
| 4,311,586 A | 1/1982 | Baldwin et al. |
| 4,437,812 A | 3/1984 | Abu-Shumays et al. |
| 4,475,821 A | 10/1984 | Koch et al. |
| 4,496,245 A | 1/1985 | Conrad et al. |
| 4,506,987 A | 3/1985 | Daughton et al. |
| 4,534,659 A | 8/1985 | Pourdeville et al. |
| 4,842,730 A | 6/1989 | James et al. |
| 4,882,062 A | 11/1989 | Moeller et al. |
| 4,882,063 A | 11/1989 | Allington et al. |
| 4,954,253 A | 9/1990 | Alexandrov et al. |
| 5,275,723 A | 1/1994 | Greenley et al. |
| 5,423,661 A | 6/1995 | Gabeler et al. |
| 5,656,034 A | 8/1997 | Kochersperger et al. |
| 5,664,938 A | 9/1997 | Yang |
| 5,738,783 A | 4/1998 | Shirota et al. |
| 5,846,411 A | 12/1998 | Harter et al. |
| 5,887,977 A | 3/1999 | Morikawa |
| 5,904,424 A | 5/1999 | Schwesinger et al. |
| 5,918,976 A | 7/1999 | Hashimoto et al. |
| 6,048,496 A | 4/2000 | Zhou et al. |
| 6,116,869 A | 9/2000 | Couillard et al. |
| 6,170,981 B1 | 1/2001 | Regnier et al. |
| 6,190,034 B1 | 2/2001 | Nielsen et al. |
| 6,319,469 B1 | 11/2001 | Mian et al. |
| 6,616,327 B1 * | 9/2003 | Kearney ............ G01N 30/6017 366/340 |
| 6,629,775 B2 | 10/2003 | Choikhet et al. |
| 6,705,357 B2 | 3/2004 | Jeon et al. |
| 6,845,787 B2 | 1/2005 | Karp et al. |
| 6,851,846 B2 | 2/2005 | Fujii et al. |
| 6,883,559 B2 | 4/2005 | Jeon et al. |
| 6,887,384 B1 | 5/2005 | Frechet et al. |
| 6,916,113 B2 | 7/2005 | Van de Goor et al. |
| 6,919,046 B2 | 7/2005 | O'Connor et al. |
| 6,942,792 B2 | 9/2005 | Aso |
| 6,958,119 B2 | 10/2005 | Yin et al. |
| 6,981,522 B2 | 1/2006 | O'Connor et al. |
| 6,987,263 B2 | 1/2006 | Hobbs et al. |
| 6,991,729 B2 | 1/2006 | Ikeda et al. |
| 7,048,512 B2 | 5/2006 | Couillard et al. |
| 7,105,304 B1 | 9/2006 | Nikiforov et al. |
| 7,111,501 B2 | 9/2006 | Rocklin et al. |
| 7,112,277 B2 | 9/2006 | Bidlingmeyer et al. |
| 7,147,364 B2 | 12/2006 | Oohashi et al. |
| 7,178,386 B1 | 2/2007 | Gamble et al. |
| 7,204,139 B2 | 4/2007 | Takayama |
| 7,207,345 B2 | 4/2007 | Somerville |
| 7,241,423 B2 | 7/2007 | Golbig et al. |
| 7,278,329 B2 | 10/2007 | Weissgerber et al. |
| 7,314,070 B2 | 1/2008 | Jeon et al. |
| 7,390,121 B2 | 6/2008 | Jahn et al. |
| 7,744,762 B2 | 6/2010 | Lazar |
| 7,887,753 B2 | 2/2011 | Quake et al. |
| 7,976,779 B2 | 7/2011 | Tai et al. |
| 8,329,407 B2 | 12/2012 | Ismagilov et al. |
| 8,511,889 B2 | 8/2013 | Choikhet et al. |
| 8,517,597 B2 | 8/2013 | Shreve et al. |
| 8,622,609 B2 | 1/2014 | Shreve et al. |
| 8,696,193 B2 | 4/2014 | Herbstritt |
| 8,764,279 B2 | 7/2014 | Castro et al. |
| 8,894,274 B2 | 11/2014 | Shreve et al. |
| 8,979,358 B2 | 3/2015 | Wiechers |
| 9,126,164 B2 | 9/2015 | Shreve et al. |
| 9,128,071 B2 | 9/2015 | Tsukada et al. |
| 9,527,010 B2 | 12/2016 | Williams et al. |
| 9,528,968 B2 | 12/2016 | Murphy et al. |
| 9,557,317 B2 | 1/2017 | Ozbal |
| 9,566,537 B2 | 2/2017 | Geng |
| 9,636,646 B2 | 5/2017 | Neerincx et al. |
| 9,645,123 B2 | 5/2017 | Angelosanto et al. |
| 9,679,757 B2 | 6/2017 | Netto et al. |
| 9,766,217 B2 | 9/2017 | Kidal et al. |
| 9,791,107 B2 | 10/2017 | Witt et al. |
| 9,884,266 B2 | 2/2018 | Dauphas et al. |
| 9,945,820 B2 | 4/2018 | Albrecht, Jr. |
| 9,968,894 B2 | 5/2018 | Shreve |
| 9,970,908 B2 | 5/2018 | Yotani et al. |
| 9,987,604 B2 | 6/2018 | Baaske et al. |
| 10,088,459 B2 | 10/2018 | Onoda et al. |
| 10,238,989 B2 | 3/2019 | Luongo et al. |
| 10,247,673 B2 | 4/2019 | Peterman et al. |
| 10,295,512 B2 | 5/2019 | Pohl et al. |
| 10,335,753 B2 | 7/2019 | De Corral et al. |
| 2002/0063060 A1 | 5/2002 | Gascoyne et al. |
| 2003/0077204 A1 | 4/2003 | Seki et al. |
| 2003/0123322 A1 | 7/2003 | Chung et al. |
| 2003/0156952 A1 | 8/2003 | Couillard et al. |
| 2004/0042340 A1 | 3/2004 | Aso |
| 2004/0092033 A1 | 5/2004 | Gustafson et al. |
| 2004/0096867 A1 | 5/2004 | Andersson et al. |
| 2004/0109793 A1 | 6/2004 | McNeely et al. |
| 2005/0118070 A1 | 6/2005 | Griss et al. |
| 2005/0252840 A1 | 11/2005 | Arnold et al. |
| 2006/0011548 A1 | 1/2006 | Yin et al. |
| 2006/0039829 A1 | 2/2006 | Suk et al. |
| 2006/0171864 A1 | 8/2006 | Caze et al. |
| 2006/0273012 A1 | 12/2006 | Dehmer |
| 2006/0280029 A1 | 12/2006 | Garstecki et al. |
| 2006/0285433 A1 | 12/2006 | Yang et al. |
| 2007/0148048 A1 | 6/2007 | Jousse |
| 2009/0142846 A1 | 6/2009 | Crenshaw et al. |
| 2009/0207687 A1 | 8/2009 | Kemperman et al. |
| 2009/0255601 A1 | 10/2009 | Baeuerle et al. |
| 2009/0268548 A1 | 10/2009 | Hartmann et al. |
| 2010/0159573 A1 | 6/2010 | Chung et al. |
| 2010/0189602 A1 | 7/2010 | Baeuerle et al. |
| 2011/0113866 A1 | 5/2011 | Finlay |
| 2011/0192217 A1 | 8/2011 | Choikhet et al. |
| 2012/0309648 A1 | 12/2012 | Tseng et al. |
| 2014/0061133 A1 | 3/2014 | Herman |
| 2014/0230528 A1 | 8/2014 | Wang et al. |
| 2014/0251448 A1 | 9/2014 | Witt et al. |
| 2014/0334251 A1 | 11/2014 | Shreve |
| 2014/0345372 A1 | 11/2014 | Gerhardt et al. |
| 2015/0059451 A1 | 3/2015 | Witt et al. |
| 2015/0132789 A1 | 5/2015 | Bornheimer et al. |
| 2016/0161454 A1 | 6/2016 | Jones et al. |
| 2016/0266078 A1 | 9/2016 | Onoda et al. |
| 2017/0173496 A1 | 6/2017 | Stone |
| 2017/0333898 A1 | 11/2017 | Saleh et al. |
| 2018/0056252 A1 | 3/2018 | Steele et al. |
| 2018/0088091 A1 | 3/2018 | Cormier et al. |
| 2019/0070571 A1 * | 3/2019 | Jackson .................. B01F 33/30 |
| 2019/0070572 A1 | 3/2019 | MacKinnon et al. |
| 2019/0170706 A1 | 6/2019 | Gilar et al. |
| 2019/0265206 A1 | 8/2019 | Tarafder |
| 2019/0337211 A1 | 11/2019 | Kazmer |
| 2019/0383777 A1 | 12/2019 | Inoue |
| 2020/0023295 A1 | 1/2020 | Moeller et al. |
| 2020/0025723 A1 | 1/2020 | Gilar et al. |
| 2020/0276728 A1 | 9/2020 | Zeko et al. |
| 2021/0156829 A1 | 5/2021 | Raymond et al. |

FOREIGN PATENT DOCUMENTS

| | | |
|---|---|---|
| CN | 204116295 U | 1/2015 |
| CN | 106166453 A | 11/2016 |
| CN | 106422832 A | 6/2017 |
| CN | 106902662 A | 6/2017 |
| CN | 104076112 B | 9/2018 |
| CN | 109173766 A | 1/2019 |
| CN | 109959745 A | 7/2019 |
| CN | 209333548 U | 9/2019 |
| CN | 209342666 U | 9/2019 |
| CN | 110394105 A | 11/2019 |
| CN | 111050895 A | 4/2020 |
| DE | 19840026 A1 | 3/1999 |
| DE | 19902697 A1 | 7/2000 |
| DE | 10307507 B4 | 9/2013 |

(56) References Cited

FOREIGN PATENT DOCUMENTS

| | | | |
|---|---|---|---|
| DE | 102015100693 A1 | 7/2016 |
| DE | 102018104840 A1 | 4/2018 |
| DE | 102018104842 A1 | 4/2018 |
| EP | 1566215 A2 | 8/2005 |
| EP | 1788388 A1 | 5/2007 |
| FR | 2768189 A1 | 3/1999 |
| FR | 2836185 A1 | 8/2003 |
| FR | 3075068 A1 | 6/2019 |
| GB | 2332378 B | 12/2001 |
| GB | 2389629 B | 12/2005 |
| GB | 2524608 B | 4/2020 |
| JP | S5994064 A | 5/1984 |
| JP | S62210042 A | 9/1987 |
| JP | H02167469 A | 6/1990 |
| JP | H06324026 A | 11/1994 |
| JP | H07159388 A | 6/1995 |
| JP | 2587162 Y2 | 12/1998 |
| JP | H02170047 A | 6/1999 |
| JP | 2603770 Y2 | 3/2000 |
| JP | 3665680 B2 | 6/2005 |
| JP | 2006003203 A | 1/2006 |
| JP | 3780917 B2 | 5/2006 |
| JP | 2006122735 A | 5/2006 |
| JP | 3865119 B2 | 1/2007 |
| JP | 3959436 B2 | 8/2007 |
| JP | 4082309 B2 | 4/2008 |
| JP | 2009018311 A | 1/2009 |
| JP | 4348820 B2 | 10/2009 |
| JP | 4360206 B2 | 11/2009 |
| JP | 4683066 B2 | 5/2011 |
| JP | 2011107004 A | 6/2011 |
| JP | 5427603 B2 | 2/2014 |
| JP | 2014228499 A | 12/2014 |
| KR | 20020085903 A | 11/2002 |
| WO | 1997000125 A1 | 1/1997 |
| WO | 0022436 A1 | 4/2000 |
| WO | 0196024 A2 | 12/2001 |
| WO | 0221121 A1 | 3/2002 |
| WO | 2003015890 A1 | 2/2003 |
| WO | 2003024598 A1 | 3/2003 |
| WO | 2003098218 A1 | 11/2003 |
| WO | 2006017039 A1 | 2/2006 |
| WO | 2007021755 A2 | 2/2007 |
| WO | 2010015238 A1 | 2/2010 |
| WO | 2010030720 A1 | 3/2010 |
| WO | 2010107677 A1 | 3/2010 |
| WO | 2010083884 A1 | 7/2010 |
| WO | 2011003412 A2 | 1/2011 |
| WO | 2011037530 A1 | 3/2011 |
| WO | 2013013717 A2 | 1/2013 |
| WO | 2013159816 A1 | 10/2013 |
| WO | 2013187916 A1 | 12/2013 |
| WO | 2014034259 A1 | 3/2014 |
| WO | 2016082520 A1 | 6/2016 |
| WO | 2018191787 A1 | 10/2018 |
| WO | 2018226907 A2 | 12/2018 |
| WO | 2019086671 A1 | 5/2019 |
| WO | 2019097490 A1 | 5/2019 |
| WO | 2019167011 A4 | 9/2019 |
| WO | 2019186223 A1 | 10/2019 |
| WO | 2019204508 A1 | 10/2019 |
| WO | 2019229819 A1 | 12/2019 |
| WO | 2019240653 A1 | 12/2019 |
| WO | 2020099865 A1 | 5/2020 |

OTHER PUBLICATIONS

International Preliminary Report on Patentability in PCT/US2022/028299 mailed on Nov. 30, 2023.
"Appropriate Mixer Volume for HPLC and UHPLC Applications," Oct. 11, 2014. https://hplctips.blogspot.com/2014/10/appropriate-mixer-volume-for-hplc-and.html.
"Dynamic Mixing Chamber Manual V.7119-1," Knauer, Berlin, Germany, Aug. 2016.
"HPLC Gradient Mixers," Mott, 2020. https://mottcorp.com/product/mixers/hplc-gradient-static-mixers/.
"HyperShear(TM) HPLC and UHPLC Mixers" 2014, Analytical Scientific Instruments US, Inc.
"Reliable Solvent Mixing in UHPLC," Thermo Fisher Scientific, Inc., 2016.
"Varian Dual Chamber Dynamic Mixer Instruction Manual," Varian, Publication No. 0391467400, Issue 5, Feb. 2009.
Chen, et al. "Combining selection valve and mixing chamber for nanoflow gradient generation: Toward developing a liquid chromatography cartridge coupled with mass spectrometer for protein and peptide analysis." Analytica Chimica Acta 887 (2015) pp. 230-236.
Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.
Davis, et al. "A Sample, Reliable Rapid-Mixing Apparatus for Continuous-Flow Studies," Analytical Biochemistry 97 (1979) pp. 428-437.
Engelhardt, Heinz and Helmut Elgass, "Problems in the application of gradient elution to high-pressure liquid chromatography," Journal of Chromatography 112 (1975) pp. 415-423.
Gilbert, Scott "Lab-on-a-chip miniaturized on-line liquid chromatography," Crystal Vision Microsystems, CPAC Satellite Workshop, Rome, Italy, Mar. 20-22, 2006.
Huft, et al. "Microfluidic Integration of Paralell Solid-Phase Liquid Chromatography," Analytical Chemistry 85 (2013) 2999-3005.
Ianovska, et al. "Development of small-volume microfluidic chaotic mixers for future application in two-dimensional liquid chromatography," RSC Adv., 2017, 7, pp. 9090-9099.
Kaminski, et al. "Programming the Elution Gradient in High-Performance Chromatography by Varying the Volume of the Mixing Chambers," Journal of Chromatography 176 (1979) pp. 171-180.
Kostanyan, Artak E. and Andrei A. Voshkin, "Support-free pulsedliquid-liquid chromatogrpahy," Journal of Chromatography A 1216 (2009) pp. 7761-7766.
Al Lawati, et al. "Combination of capillary micellar liquid chromatography with on-chip microfluidic chemiluminescence detection for direct analysis of buspirone in human plasma," Talanta 127 (2014) pp. 230-238.
Qian, Shizhi and Haim H. Bau, "Magneto-hydrodynamics based microfluidics," Mechanics Research Communications 36 (2009) 10-21.
Shi, et al., "Mixing enhancement via a serpentine micromixer for real-time activation of carboxyl," Chemical Engineering Journal, 2019. https://doi.org/10.1016/j.cej.2019.123642.
Steele, et al. "Reducing HPLC/UHPLC System Noise and Volume with High Performance Static Mixers," Feb. 26, 2017, Mott Corporation.
Takeuchi, Toyohide and Daido Ishii, "Continuous Gradient Elution in Micro High-Performance Liquid Chromatography," Journal of Chromatography 253 (1982) pp. 41-47.
Wang, et al. "On-line two-dimensional countercurrent chromatography × high performance liquid chromatography system with a novel fragmentarydilution and turbulent mixing interface for preparation of coumarinsfrom Cnidium monnieri" Journal of Chromatography A, 1406 (2015) pp. 215-223.
International Search Report and Written Opinion in PCT/US2021/039058 mailed on Oct. 14, 2021.
International Search Report and Written Opinion in PCT/US2021/039065 mailed on Oct. 19, 2021.
International Search Report and Written Opinion in PCT/US2022/028299 mailed on Aug. 2, 2022.
Restriction Requirement in U.S. Appl. No. 17/739,603 mailed on Sep. 25, 2024.
Notice of Allowance in U.S. Appl. No. 17/358,391 mailed on Jan. 18, 2024.
International Preliminary Report on Patentability in PCT/US2022/030670 mailed on Jan. 4, 2024.
International Preliminary Report on Patentability in International Application No. PCT/US2021/039058, mailed on Jan. 19, 2023.

(56) References Cited

OTHER PUBLICATIONS

International Preliminary Report on Patentability in International Application No. PCT/US2021/039065, mailed on Jan. 19, 2023.
Final Office Action in U.S. Appl. No. 17/358,360 mailed on Feb. 28, 2023.
Non-Final Office Action in U.S. Appl. No. 17/358,360 mailed on Sep. 15, 2022.
International Search Report and Written Opinion in PCT/US2022/030670 mailed on Sep. 23, 2022.
Non-Final Office Action in U.S. Appl. No. 17/739,603 mailed on Jan. 3, 2025.
Notice of Allowance in U.S. Appl. No. 17/739,603 mailed on Apr. 16, 2025.
Examination Report in European Patent Application No. 22732754.1 mailed on Oct. 23, 2025.

* cited by examiner

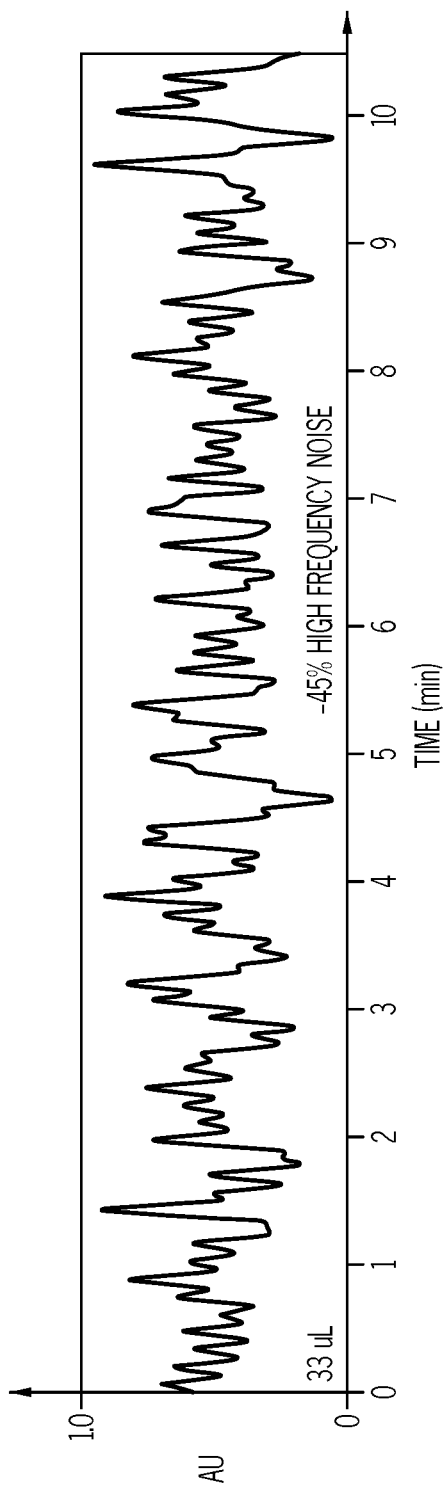
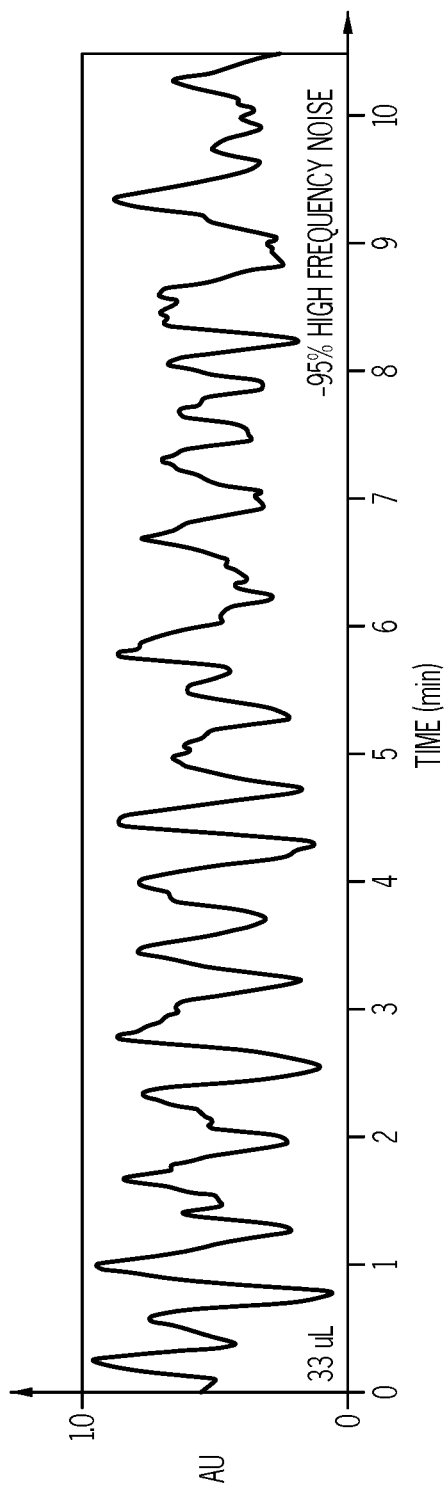

PASSIVE SOLVENT MIXER FOR LIQUID CHROMATOGRAPHY

RELATED APPLICATION

This application is a non-provisional patent application claiming priority to U.S. Provisional Patent Application No. 63/213,890, filed Jun. 23, 2021, entitled "Passive Solvent Mixer for Liquid Chromatography," which is incorporated herein by reference.

FIELD OF THE INVENTION

The disclosed technology relates generally to a solvent mixer. More particularly, the technology relates to a passive solvent mixer to reduce periodic compositional solvent noise.

BACKGROUND

A typical liquid chromatography system includes one or more pumps for delivering a fluid (the "mobile phase") at a controlled flow rate and composition, an injector to introduce a sample solution into the flowing mobile phase, a chromatographic column that contains a packing material or sorbent (the "stationary phase"), and a detector to detect the presence and amount of the sample components in the mobile phase leaving the column. Some liquid chromatography systems may require that a sample be diluted before the sample is injected into the mobile phase flowing to the chromatography column. When the mobile phase passes through the stationary phase, each component of the sample typically emerges from the column at a different time because different components in the sample generally have different affinities for the packing material. The presence of a particular component in the mobile phase exiting the column may be detected by measuring changes in a physical or chemical property of the eluent. By plotting the detector signal as a function of time, response "peaks" corresponding to the presence and quantities of the components of the sample may be observed.

In gradient elution chromatography, the mobile phase is typically generated by mixing two or more independently controlled solvent packet volumes when mixing is performed at low pressure. The volumes of the solvent packets are typically fractions of a pump stroke volume of a reciprocating pump. These solvent packets are concatenated to form a serial train of solvent plugs of different composition at low pressure (e.g., atmospheric pressure) before arriving at the pump system. Alternatively, solvent flows are merged at high pressure in a tee junction downstream from the pump system. A mixer is typically used to ensure that the time-programmed composition of the mobile phase at the inlet of the chromatographic column is accurate and has a low compositional noise level through the duration of the chromatographic separation to maximize detection sensitivity.

Liquid chromatography systems can exhibit significant periodic baseline noise. Such noise can dramatically increase the lower limit of detection of the detector (e.g., the minimum absorbance unit for an optical detector) and reduce the number of identified compounds when separating complex mixtures by various liquid chromatography techniques. The problem is particularly significant for the reverse phase liquid chromatography (RPLC) gradient methods using trifluoroacetic acid (TFA) as an additive present in the pure solvents (e.g., water and acetonitrile) to be mixed during the gradient for peptide mapping. The origin of the observed cyclic noise is the reciprocating pump system. For example, the pumping system may be part of a quaternary solvent manager (QSM) used with low pressure (e.g., ambient pressure) mixing of the solvents for delivery of the programmed eluent mixture. Alternatively, the pumping system may be part of a binary solvent manager (BSM) used with high pressure mixing of the solvents. The mechanical and cyclic operation of the reciprocating pumps leads to variations in the desired concentration profiles of solvent composition during the chromatographic run. Both low pressure and high pressure mixing pumps induce a periodic noise which is related to the pump stroke volume and the applied flow rate. Current post-pump mixers, such as 200 μm packed beads columns, are substantially inefficient in reducing this periodic baseline noise.

Two-path split flow mixers are sometimes used to reduce the periodic baseline noise. Performance of such mixers is generally limited to reducing the periodic noise to about half of the noise observed with a mixer. This level of reduction may be insufficient to meet the requirements of many liquid chromatography system users (e.g., noise amplitude less than 0.1 milli absorption units (mAU)).

SUMMARY

In one aspect, a mixer for a liquid chromatography includes an inlet, an outlet, a first flow channel, and a second flow channel. The inlet is configured to receive a fluid flow and the outlet is configured to provide the fluid flow. Each of the first and second flow channels is coupled between the inlet and the outlet. The second flow channel includes an offset volume configured to delay fluid propagation through the second flow channel relative to the first flow channel. The offset volume includes a coiled channel, wherein a radial dispersion of a fluid flow through the coiled channel is increased.

The inlet may be configured to equally split the fluid flow between the first and second flow channels.

The coiled channel may be a coiled tube. The coiled tube may be formed as a helical coiled tube or a flat coil.

The coiled channel may include a plurality of serially coupled coiled channels. The serially coupled coiled channels may be formed in a single plane.

The coiled channel may be formed in or on a surface of a substrate.

The coiled channel may be a first coiled channel and the mixer may further include a second coiled channel fluidically coupled to the outlet of the mixer, wherein the second coiled channel increases a radial dispersion of the fluid flow from the outlet of the mixer.

In another aspect, a liquid chromatography system includes a mixer, an injector, and a chromatography column. The mixer includes an inlet, an outlet, a first flow channel, and a second flow channel. The inlet is configured to receive a fluid flow and the outlet is configured to provide the fluid flow. Each of the first and second flow channels is coupled between the inlet and the outlet. The second flow channel includes an offset volume configured to delay fluid propagation through the second flow channel relative to the first flow channel. The offset volume includes a coiled channel, wherein a radial dispersion of a fluid flow through the coiled channel is increased. The injector is configured to receive the solvent flow from the mixer and to inject a sample into the solvent flow. The chromatography column is in fluid communication with the injector for performing a separation of the sample.

The liquid chromatography system may include a pump in fluid communication with the inlet of the mixer to provide the solvent flow from the mixer. The liquid chromatography system may further include a gradient proportioning valve to provide the solvent flow to the pump.

The liquid chromatography system may include a first pump to provide a flow of a first solvent, a second pump to provide a flow of a second solvent, and a fluidic tee. The fluidic tee has a first inlet in fluid communication with the first pump, a second inlet in fluid communication with the second pump, and an outlet in fluid communication with the inlet of the mixer to provide the solvent flow to the mixer.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIG. 9A shows an example of the periodic noise at a target frequency for a split flow mixer with a straight tube offset volume.

FIG. 9B shows an example of the periodic noise at the target frequency for a split flow mixer using a coiled tube offset volume.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

The present teaching will now be described in detail with reference to exemplary embodiments thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. For example, various embodiments described herein refer to solvents although it should be recognized that other fluids can be used. Those of ordinary skill having access to the teaching herein will recognize additional implementations, modifications, and embodiments, as well as other fields of use, which are within the scope of the present disclosure as described herein.

In brief overview, embodiments disclosed herein are directed to a mixer for a liquid chromatography system. The mixer includes an inlet, an outlet, a first flow channel, and a second flow channel. The inlet receives a fluid flow and the outlet provides the fluid flow exiting the mixer. Each of the two flow channels is coupled between the inlet and the outlet. The second flow channel includes an offset volume that delays fluid propagation through the second flow channel relative to the first flow channel. The offset volume includes a coiled channel which increases radial dispersion of a fluid flowing through the offset volume.

Mixers disclosed herein can provide a substantial reduction in the periodic noise of liquid chromatography systems. Some embodiments enable a near complete elimination of the periodic noise thereby significantly increasing detection sensitivity. For example, the value of the minimum absorbance unit of an optical detector may be significantly reduced. Consequently, the number of compounds detected when separating complex mixtures may be increased.

Figure 1:
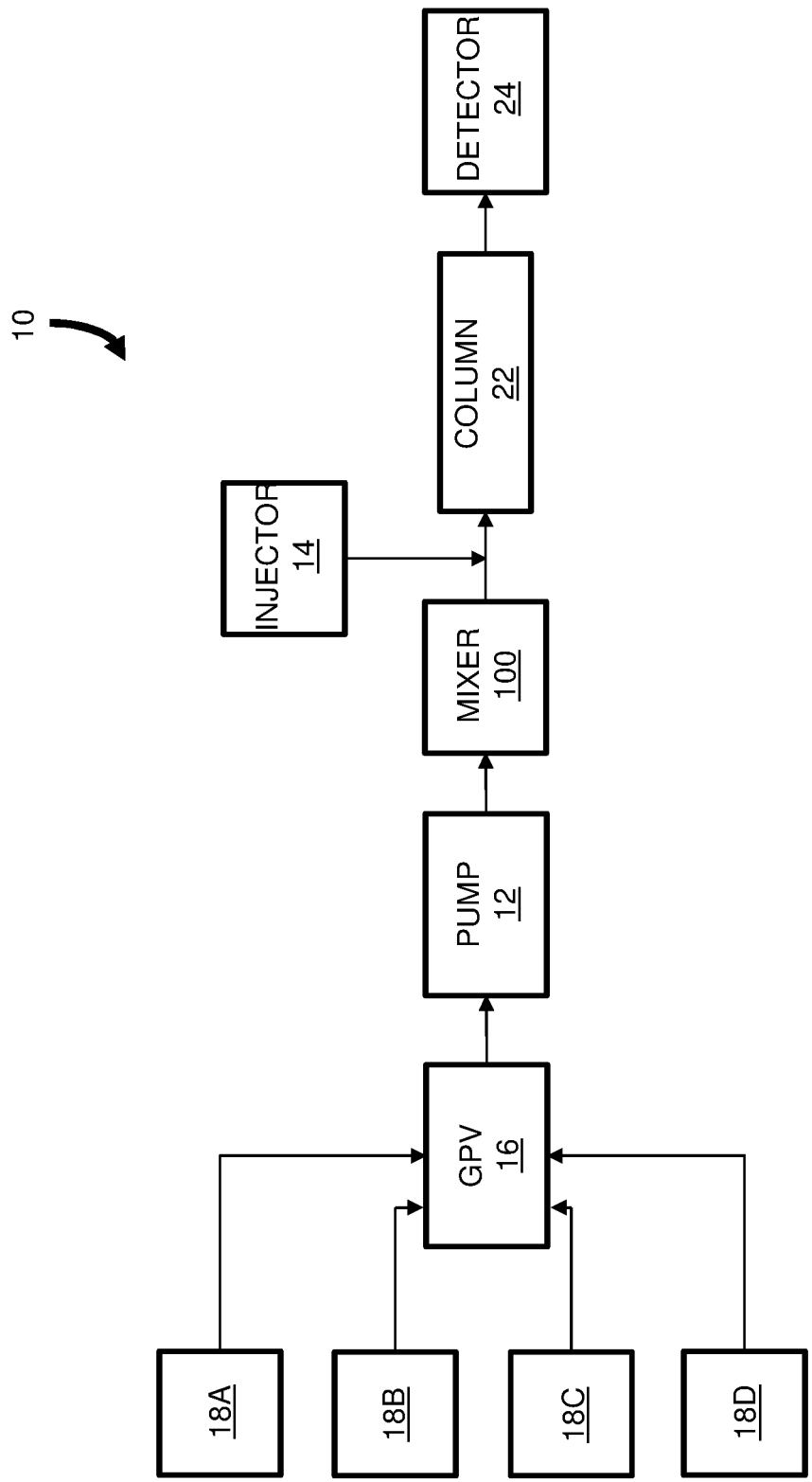
FIG. 1 is a block diagram of a liquid chromatography system.

FIG. 1 is a block diagram of a liquid chromatography system 10 having a mixer 100. The liquid chromatography system 10 can be a high pressure liquid chromatography (HPLC) system, an ultraperformance liquid chromatography (UPLC®) system, or the like. The liquid chromatography system 10 includes a solvent delivery system to provide a mobile phase. The solvent delivery system includes a plurality of solvent reservoirs 18A, 18B, 18C and 18D (generally 18). The solvent reservoirs 18 are connected to a gradient proportioning valve (GPV) 16 which provides a flow of discrete fluidic plugs of the solvents to be combined to a quaternary pump 12.

The pump 12 may have a single pair of pump heads and can deliver a high pressure flow of a solvent mixture that includes up to four different solvents (as shown, solvents from one or more of the reservoirs 18). Compositional noise occurs because only one solvent is delivered at a time to the pump 12 from the GPV 16. The GPV 16 alternates between the solvents rapidly to achieve the commanded solvent composition for the mobile phase; however, the solvents may not fully blend in the pump heads. Additionally, during a mobile phase gradient where the set composition is changing over time, each pump stroke has a different solvent composition. The solvent flow from the quaternary pump 12 is characterized by an undesirable staircase-shaped solvent composition profile that may need mixing. Moreover, noise associated with the volume of the pump stroke can add noise to the solvent composition. Thus, mixing is generally required to allow for a proper mobile phase solvent composition to be provided to the chromatographic column 22.

Figure 5:
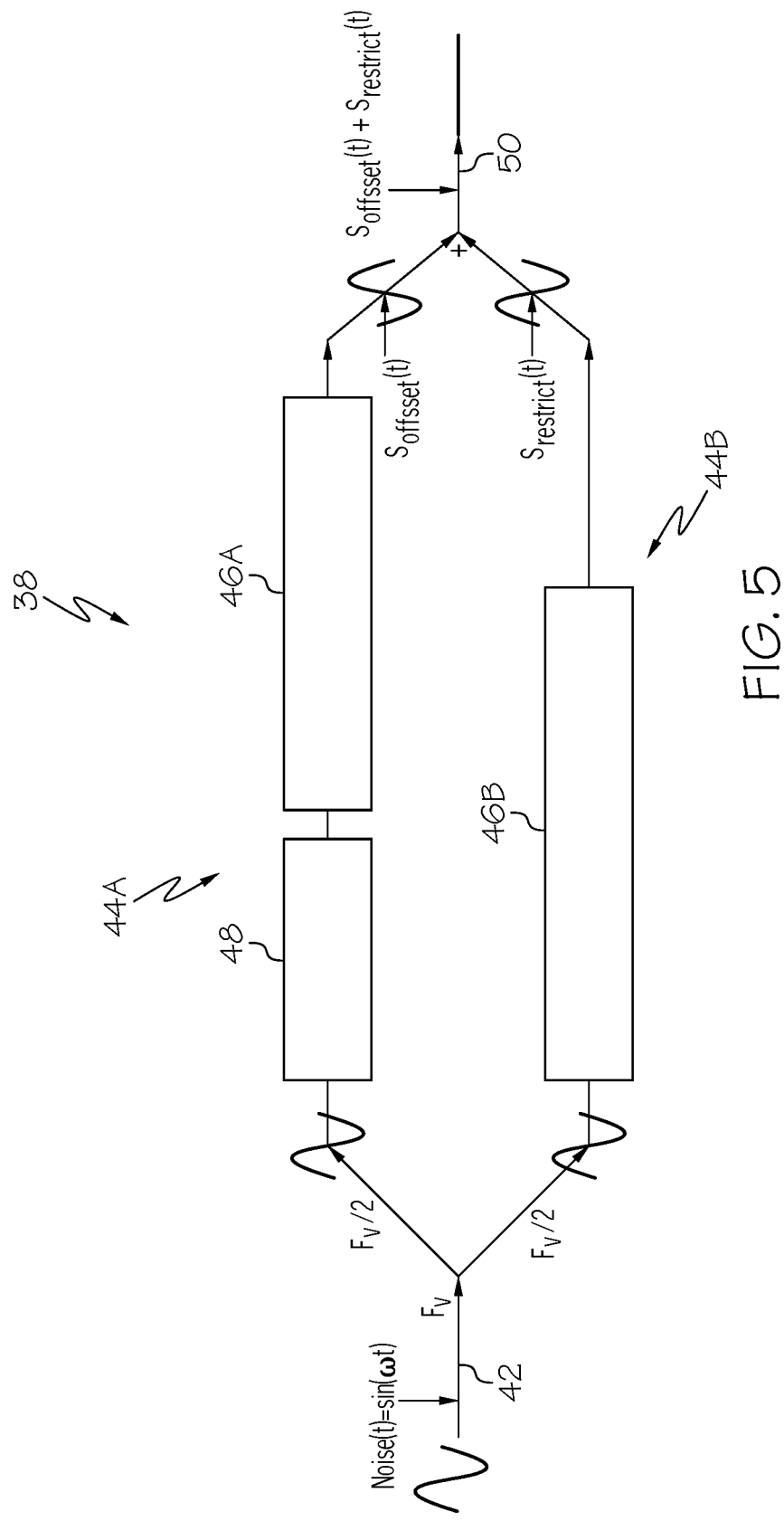
FIG. 5 is a schematic depiction of a split flow mixer that reduces or cancels noise at a noise frequency.

A mixer 100 is provided downstream from the quaternary pump 12. The mixer 100 can be configured to passively mix the pumped solvent mixture in accordance with embodiments described herein. While the specific features of one embodiment of a mixer 100 are shown in FIG. 5 and described below, the liquid chromatography system 10 can include any mixer in accordance with the principles described below.

Referring again to FIG. 1, an injector 14 is disposed downstream from the mixer 100. The injector 14 may be included as a feature of a sample manager or other assembly or sub-system configured to inject a sample into the mobile phase that exits the mixer 100. The injector 14 may include an injector valve with a sample loop. The sample manager can control the injector valve and may operate in one of two states: a load state and an injection state. In the load state, the injector valve is configured to enable the solvent manager to load the sample into the sample loop. In the injection state, the injector valve is configured such that the solvent manager enables the sample in the sample loop to be injected into the continuously flowing mobile phase provided by the mixer 100.

The chromatography column 22 receives the mobile phase carrying the injected sample and analytes in the sample are separated in the eluent exiting the column 22. The output port of the column 22 is fluidically coupled to a detector 24, for example, a mass spectrometer or an ultraviolet (UV) detector. The detector 24 produces an output from which the identity and quantity of analytes in the sample can be determined. Noise in the detector output can affect the lower limit of detection, peak resolution and compound identification.

Figure 2:
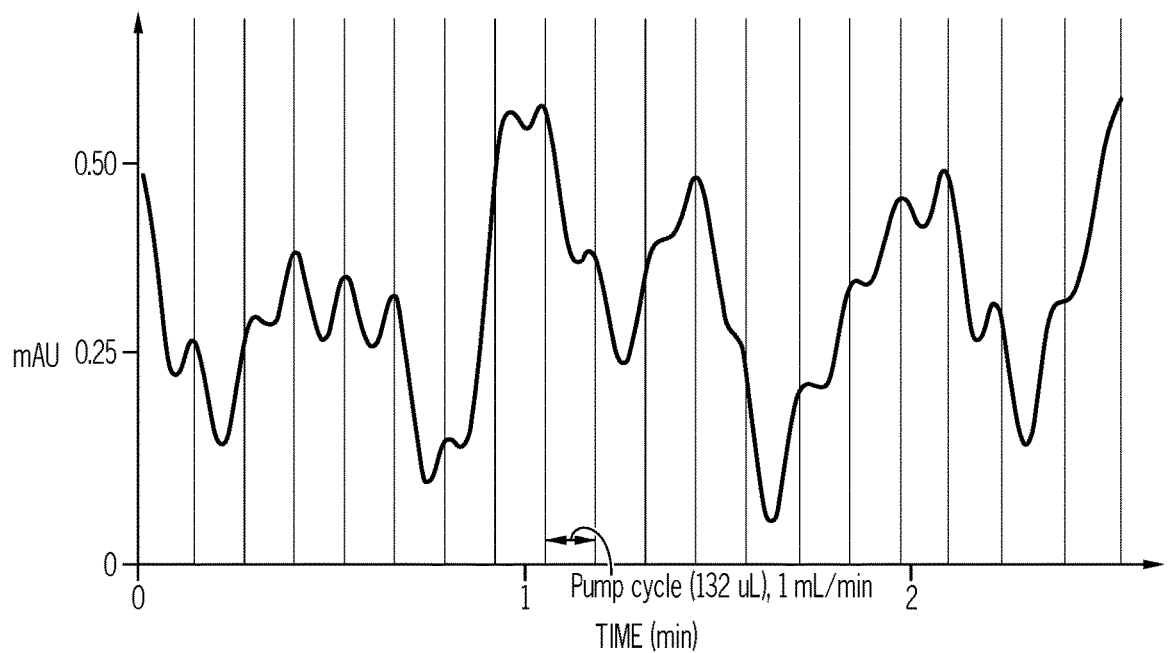
FIG. 2 shows an example of a baseline detector signal having periodic noise for a liquid chromatography system according to FIG. 1.

In one example, a quaternary solvent manager containing the gradient proportioning valve 16 and solvent reservoirs 18 is used to generate a solvent mixture. The mixture is formed as 95% water volume and 5% acetonitrile (ACN) volume. Both components include an additive of 0.1% of trifluoroacetic acid (TFA). The pump 12 is operated with a 132 μL pump stroke volume and delivers a flow of one mL/min. A 675 μL column bed is used as the mixer 100 and a reverse phase liquid chromatography (RPLC) column is used. The baseline detector signal is shown in FIG. 2 where the displayed noise peak to valley is approximately 0.5 milli-absorbance units (mAU). When water flows through the column 22, more TFA is retained on the column 22 than when ACN flows through the column 22. The detector 24 may be a UV detector for which the presence of TFA in the solvent flow being analyzed can yield a strong absorption response. The noise exhibited in the detector signal is evidence that the combined flow of water and ACN is not fully mixed. A significant frequency noise component at approximately 0.126 Hz can be seen and is associated with the 132 μL pump stroke volume. Thus, a mixer can be employed that addresses this frequency to thereby substantially reduce the noise in the baseline detector output.

Figure 3:
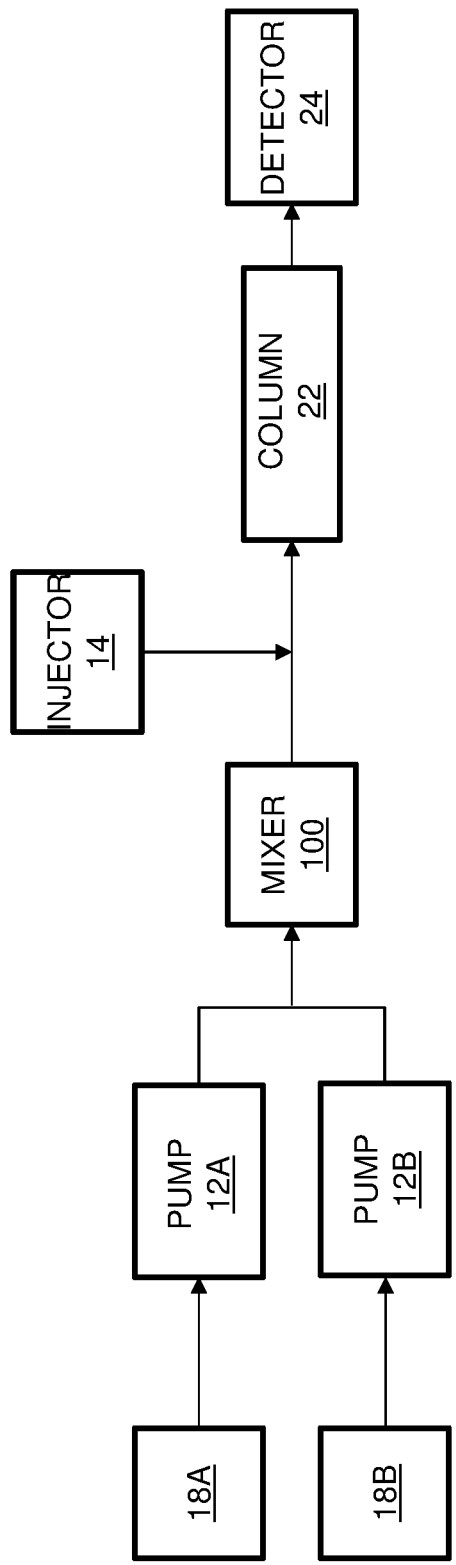
FIG. 3 is a block diagram of another liquid chromatography system.

FIG. 3 is a block diagram of another liquid chromatography system 30. Instead of using a single pump to generate a high pressure solvent flow of discrete fluidic plugs from a gradient proportioning valve, two pumps 12A and 12B are used with each pump being coupled to a respective one of two solvent reservoirs 18A and 18B. The solvent flows from the two pumps 12 are merged at high pressure in a fluidic line (e.g., at a fluidic tee) and the combined solvent flows pass through the mixer 100 before reaching the column 22. Although this technique of combining solvents does not include discrete fluidic plugs of individual solvents, the solvent mixture generally exhibits noise associated with the volumes of the pump strokes.

Figure 4:
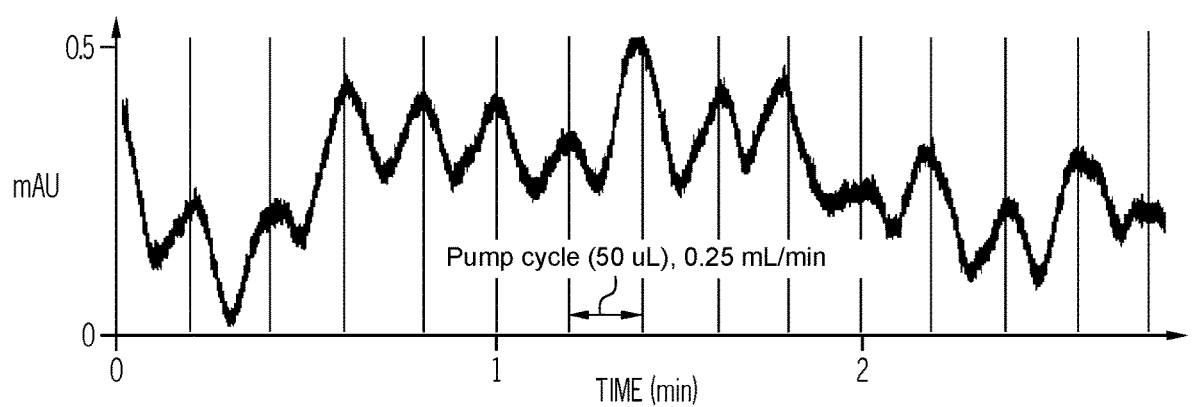
FIG. 4 shows an example of a baseline detector signal having periodic noise for a liquid chromatography system according to FIG. 3.

In one example, a binary solvent manager containing the pumps 12 and solvent reservoirs 18 of FIG. 3 is used to generate a solvent mixture formed as 95% water volume and 5% acetonitrile (ACN) volume with each solvent component including an additive of 0.1% TFA. Both pumps 12 are operated with a 50 μL pump stroke volume and the combined flows are delivered to a 50 μL column bed mixer at a flow rate of 0.25 mL/min. A reverse phase liquid chromatography (RPLC) column for ultra high performance liquid chromatography (UHPLC) is used. The baseline detector signal is shown in FIG. 4 where the dominant frequency in the noise signal has an amplitude of approximately 0.5 mAU. Again, the noise exhibited in the detector signal is evidence that the combined flow of water and ACN is not fully mixed. A significant frequency noise component at approximately 0.083 Hz can be seen and is associated with the 50 pump stroke volumes. For this configuration, a mixer can be used that addresses the frequency component to thereby substantially reduce the baseline detector noise.

A two-path split flow mixer can be used to reduce or cancel a particular noise frequency. For example, U.S. patent application No. 63/081,524, incorporated herein in its entirety, describes a volumetric frequency cancelling split flow mixer that may be used for this purpose. FIG. 5 shows a schematic depiction of a split flow mixer 38 that reduces or cancels noise at a noise frequency.

The noise signal Noise(t) to be cancelled has a radial frequency ω. The solvent mixture at a flow rate $F_v$ is received at a mixer inlet 42 and is split into two flow channels 44A and 44B such that each flow channel has a flow rate of $F_v/2$. Each flow channel 44 has a restrictor 46 that provides the primary flow resistance through the path. The upper flow channel 44A also includes an offset volume 48 upstream from the flow restrictor 46A. As indicated by the sinusoidal signals at the beginning of each flow channel 44, the noise signals are in phase; however, the offset volume 48 provides a flow delay such that the noise signal $S_{offset}(t)$ at the end of the upper flow channel 44A is out of phase with the noise signal $S_{restrict}(t)$ at the end of the lower flow channel 44B by 7C radians. Consequently, the combined signals $S_{offset}(t)+S_{restrict}(t)$ at the mixer outlet 50 result in cancellation of the noise signal at the frequency ω.

In implementation, only a partial cancellation occurs. For example, the reduction in the noise at the frequency ω may only be approximately 55%. In another example, evaluation of a two-path split flow mixer having an offset volume of 33 μL formed as a 6.4 in long tube having an inner diameter of 0.020 in. exhibited incomplete cancellation. The flow channel 44A of the split flow mixer that included the offset volume (i.e., the offset path) yielded non-Gaussian and asymmetric peaks in response to impulse injections whereas the other flow channel 44B had a narrow and substantially symmetrical response to the impulse injections. In effect, the offset flow channel 44A provided a large dispersion that significantly limited performance. More specifically, the convolution of the narrow impulse response of the flow path 44B and the sinusoidal noise function yields a substantially sinusoidal signal at the mixer outlet 50 where the two flows are combined. In contrast, the convolution of the broader and asymmetric impulse response of the offset flow channel 44A and the sinusoidal noise function yields a signal showing significant distortion to the sinusoidal nature of the noise function. Thus, the combination (i.e., sum) of the two signals provides only partial cancellation.

The difference in the amplitudes of the convolutions for the two flow channels 44A and 44B is ideally zero for complete cancellation at the noise frequency; however, a small difference in the amplitudes may be acceptable for many applications. For example, a difference in the amplitude for the offset flow channel 44A relative to the other flow channel 44B that does not exceed 5% may be acceptable.

In some applications, it is desirable to address two or more noise frequencies. U.S. provisional patent application No. 63/081,524 describes how split flow mixers may be arranged in series to compensate for noise at two or more frequencies. For an implementation having two split flow mixers each implemented as two coplanar flow channels and the two mixers coupled in series by a short length of tubing, the angular orientation of the mixer planes with respect to each other affects the degree of cancellation that can be achieved. The variation is due, at least in part, to insufficient radial mixing such that the laminar flow regime existing in the region of combined flows exiting the mixer adversely affects performance. As a result, an incremental volume of liquid leaving the first mixer does not necessarily have an equal opportunity to pass through either of the two flow channels in the second (downstream) mixer.

In the various embodiments described below, the axial dispersion of the flow channels in a split flow mixer are preferably maintained as small as practical while the radial dispersion of the combined flows exiting the mixer is preferably increased to ensure better radial mixing and therefore substantially equalize, or balance, the probability that an incremental volume of liquid in the combined flows will pass through either flow channel in the second mixer. In other words, the incremental volume has an approximately 50% chance to pass through each flow channel of the downstream split flow mixer.

Advantageously, there is an inverse relationship between the axial dispersion and the radial dispersion. Thus, increasing the radial dispersion helps to decrease the axial dispersion through the same flow channel. In embodiments described below, an offset volume is provided in a coiled channel configuration. As used herein, a coiled channel means a length of channel that is curved. For example, the channel may be wound, arranged in a spiral shape and/or in a sequence of interconnected rings. In one example, the coiled channel has a shape defined by a path wound uniformly in at least one layer around a cylinder or cone. In other examples, the coiled channel is flat, that is, two-dimensional, such that part or all the coiled channel lies in a plane. The coiled channel may be defined by tubing or another type of conduit which is shaped to define the desired fluidic path. In the various embodiments described below, the coiled channel is described primarily as a coiled tube; however, it will be recognized that in some implementations the tube may be replaced by other forms of a channel. For example, the coiled channel may be defined on a surface of a substrate or be an internal channel in the substrate. The fluid layers in the coiled channel experience a radial acceleration due to centrifugal force which leads to increased mixing of the layers. This effect contrasts with a straight channel in which the fluid velocity has no radial component.

As the radius of the coil is decreased, the radial dispersion increases and the axial dispersion decreases.

Figure 6:
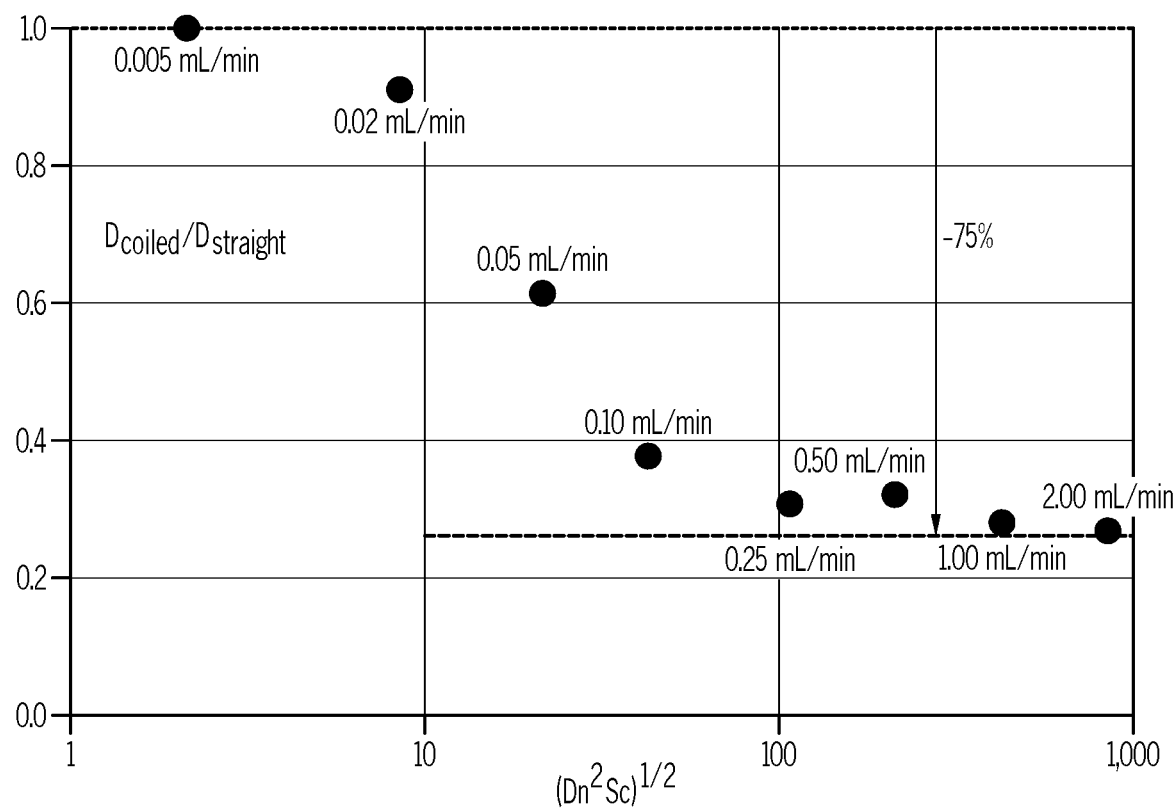
FIG. 6 is a graphical representation of experimental data that shows how axial dispersion is decreased and radial dispersion is increased as the coil diameter of a coiled channel is decreased.

FIG. 6 is a graphical representation of experimental data showing how axial dispersion is decreased and, consequentially, how radial dispersion is increased as the coil diameter of a coiled channel is decreased. The horizontal axis depicts the square root of the product of the Schmidt number Sc and $Dn^2$ where Dn is the Dean number. The vertical axis depicts the axial dispersion of the analyte along the coiled tube normalized to the axial dispersion for the same tube in an uncoiled (i.e., straight) configuration.

The dimensionless Dean number, Dn, is $$Dn = Re(r_{tube}/R_{coil})^{0.5}$$

where $r_{tube}$ is the inner radius of the open tube, $R_{coil}$ is the radius of the coiled tube, and Re is the Reynolds number. Re is defined by $$Re = 2r_{tube}\rho U/\eta$$

where $\rho$ is the density of the flowing fluid, U is the average linear velocity of the fluid across the tube cross-sectional area, and $\eta$ is the fluid viscosity. Sc is the dimensionless Schmidt number defined by $$Sc = \eta/(\rho D_m)$$

where $D_m$ is the bulk diffusion coefficient of the analyte in the fluid phase. $D_{coiled}$ is the axial dispersion of the analyte along the coiled tube while $D_{straight}$ is the same as $D_{coiled}$ for the same tube except that the tube is straight. The data were obtained for flow rates ranging from 0.005 mL/min. to 2.00 mL/min where the tube has an inner diameter of 0.0085 in. (216 μm).

The data displayed in FIG. 6 are consistent with evaluations of the dispersion properties of curved tubes as described in "Axial Dispersion in Laminar Flow Through Coiled Tubes", Chemical Engineering Science, Vol. 31, Issue No. 3, 1976, pages 215-218. The centrifugal forces present in fluid layers in a laminar flow regime contribute to increased radial dispersion across the inner diameter of the tube while, at the same time, reducing the axial dispersion of the tube. The centrifugal forces are generated by the curvature of the coiled tube. To achieve desired changes in the axial and radial dispersion properties of the coiled tube, the curvature radius $1/R_{coil}$ of the coiled tube should be greater than a value that depends on the applied flow rate and the inner diameter of the tube. This value corresponds to the square root of the product of the square of the Dean number Dn and the Schmidt number Sc (discussed above) being greater than approximately 100 (see, e.g., FIG. 6). The largest relative reduction in axial mixing and the largest relative increase in radial mixing in curved tubes is estimated to be about 75% and 300%, respectively, with respect to a straight but otherwise identical tube.

Figure 7:
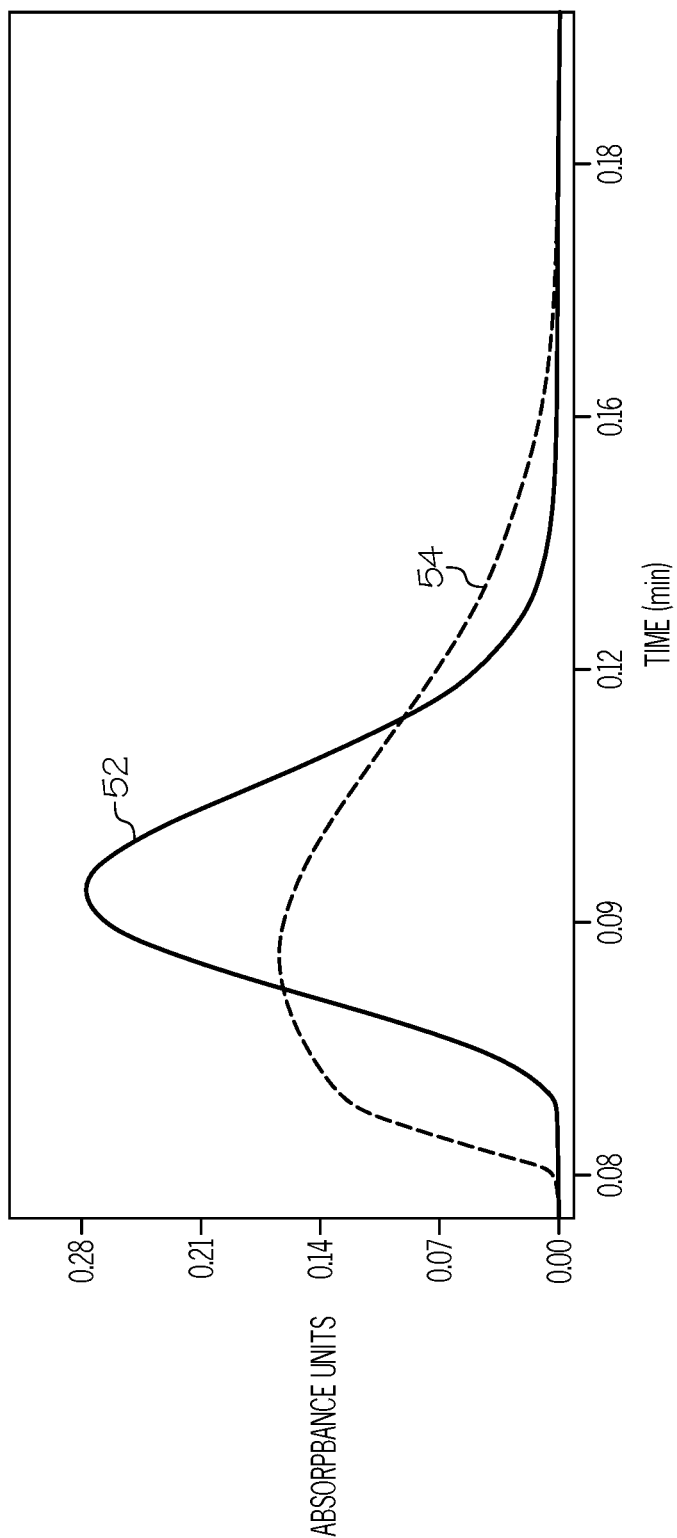
FIG. 7 graphically depicts the response of a coiled tube and a straight tube having the same inner diameter to an impulse injection of caffeine in water.

The data for abscissa values greater than 100 indicate that the axial dispersion is decreased to approximately 25% or less of a straight tube. A coiled tube having an inner diameter of approximately 250 μm (0.010 in.) can be used without causing an unacceptable increase in system back pressure. By way of a non-limiting numerical example, an offset volume of approximately 33 μL can be obtained using a 250 μm inner diameter tube and an approximately 70 cm long coiled tube having a coil diameter of about 1 cm (0.4 in.) or less. When compared to a straight tube of similar inner diameter, the result is a more symmetrical response to an impulse component along with a decrease to about 25% of the axial dispersion for the straight tube. The axial dispersion for the coiled tube relative to that of a straight tube of the same inner diameter is shown in FIG. 7 where an impulse injection of caffeine in water was used to determine the dispersion. The substantially symmetrical plot 52 indicates the caffeine after propagation through the coiled tube while the broader asymmetric plot 54 indicates the caffeine after propagation through the straight tube.

Figure 8:
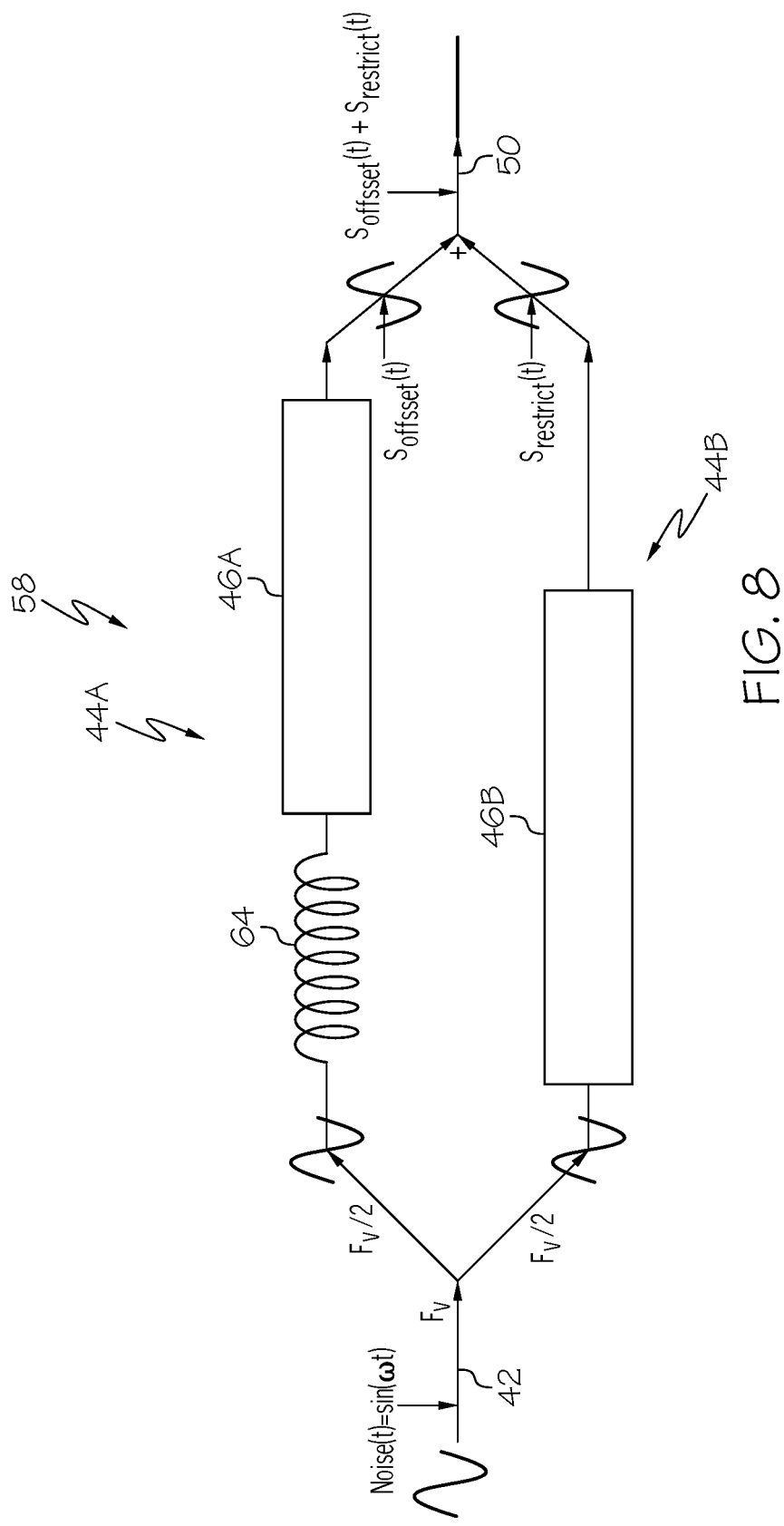
FIG. 8 is a schematic representation of an embodiment of a split flow mixer in which the offset volume is a coiled channel.

FIG. 8 is a schematic representation of a split flow mixer 58 in which the offset volume is in the form of a coiled channel 64. As discussed above, the split flow mixer 58 achieves a substantial improvement in performance over a split flow mixer that implements the offset volume as a straight tube or straight flow path.

A liquid chromatography system in which a combined solvent flow is formed at lower pressure, such as is shown in FIG. 1, was evaluated for different mixer arrangements, including an arrangement in which the split flow mixer 58 of FIG. 8 was present. The evaluated system was an AQUITY Arc® liquid chromatography system available from Waters Corporation of Milford, MA. The system included a quaternary solvent manager in which the mixed solvent flow is first formed using a GPV 16 and the combined flow is mixed at a mixer 100 downstream from a single pump 12 having a 132 µL pump stroke volume. The system further included a 675 column bed mixer and a Sunfire-C18 4.6 mm×150 mm reverse phase liquid chromatography column packed with 5 um fully porous particles.

FIGS. 9A and 9B demonstrate an improvement in terms of noise reduction for the evaluated system. The split flow mixer has an offset volume defined by a coiled channel in the form of a coiled tube. The figures correspond to measurements performed using a 2 mL/minute flow rate of 5% acetonitrile volume to 95% water volume with both solvents having 0.1% TFA. A 4.6 mm×150 mm C18 5 µm chromatography column was used. FIG. 9A shows that the high frequency noise at the target frequency for the split flow mixer with the straight tube offset volume has been reduced by approximately 45%. In contrast, FIG. 9B shows that the high frequency noise at the target frequency for the split flow mixer using the coiled tube offset volume has been reduced by approximately 95%. What remains is primarily low frequency noise which is at a much lower frequency that the targeted frequency corresponding to the 33 offset of the split flow mixers. To address this lower frequency noise, a split flow mixer configured to address the lower frequency noise can be coupled in series to the split flow mixer having the 33 µL offset.

A liquid chromatography system in which the solvent flows are mixed at high pressure, such as is shown in FIG. 3 where the flow paths from the two pumps 12A and 12B are coupled together and the combined flow is received at the mixer 100, was evaluated for different mixer arrangements. The system was an I-Class ACQUITY® liquid chromatography system available from Waters Corporation of Milford, MA. The system includes a binary solvent manager using two pumps each having a 50 µL pump stroke volume. A 2.1 mm×150 mm HSS-T3 1.8 um reverse phase liquid chromatography column and 215 nm ultraviolet (UV) detector were used. The combined solvent flow was 5% acetonitrile plus 0.1% TFA and 95% water plus 0.1% TFA at 0.25 mL/min.

Figure 10:
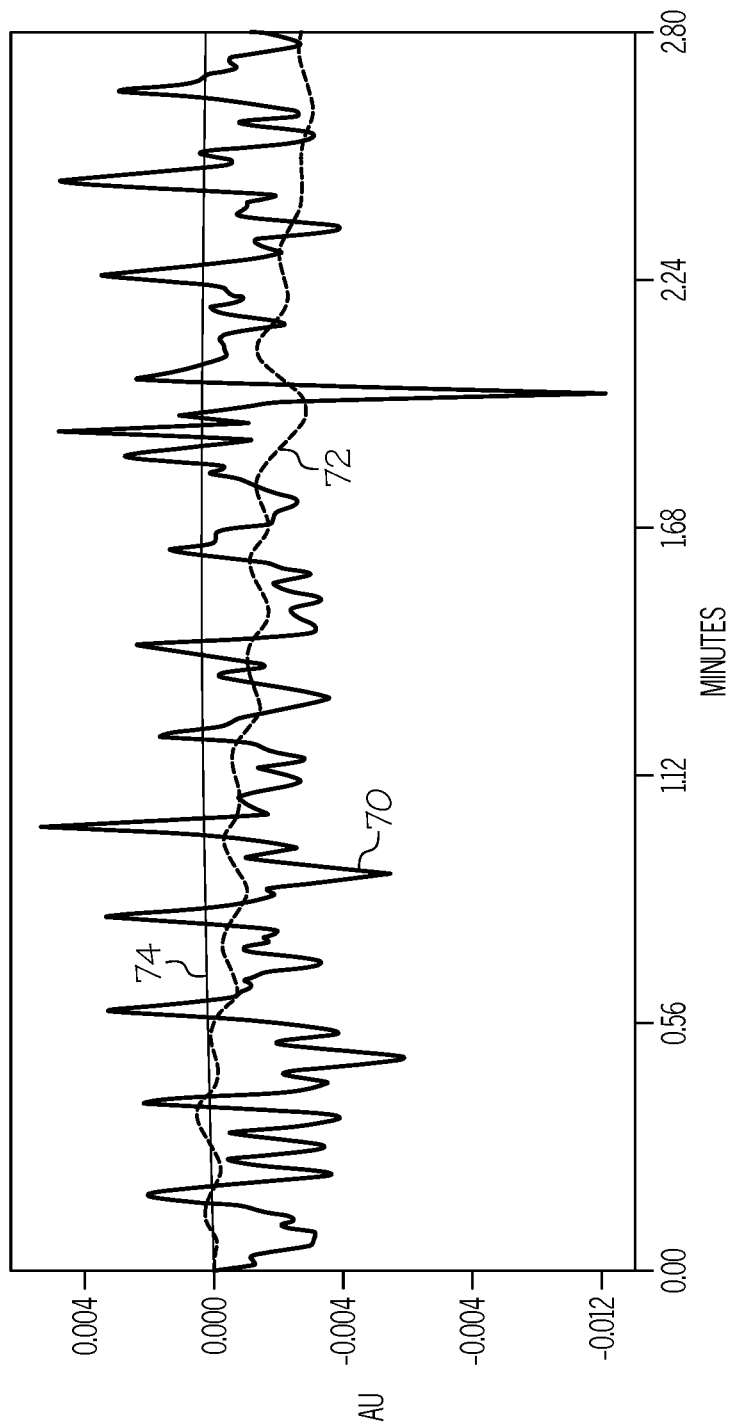
FIG. 10 is a graphical representation of a detector signal for a liquid chromatography system for three different mixer configurations.

FIG. 10 shows a graphical representation of the detector signal for the system for three different configurations. Plot 70 represents one configuration in which no mixer was used. The noise from the reciprocating action of the two pumps is evident. As the two pumps are operating at different speeds, the resulting signal is the superposition of two waveforms having two different dominant frequencies.

Plot 72 represents a second configuration in which a 50 µL mixer having a packed bed of 200 um ZrO2 beads, a 0.147 in. inner diameter and a 0.150 in. length, available as model no. 700002911 from Waters Corporation of Milford, MA., was used. Although a significant reduction in the high frequency noise was achieved, plot 72 exhibits significant periodic noise at a frequency corresponding to the stroke volumes of the two pumps.

Figure 11:
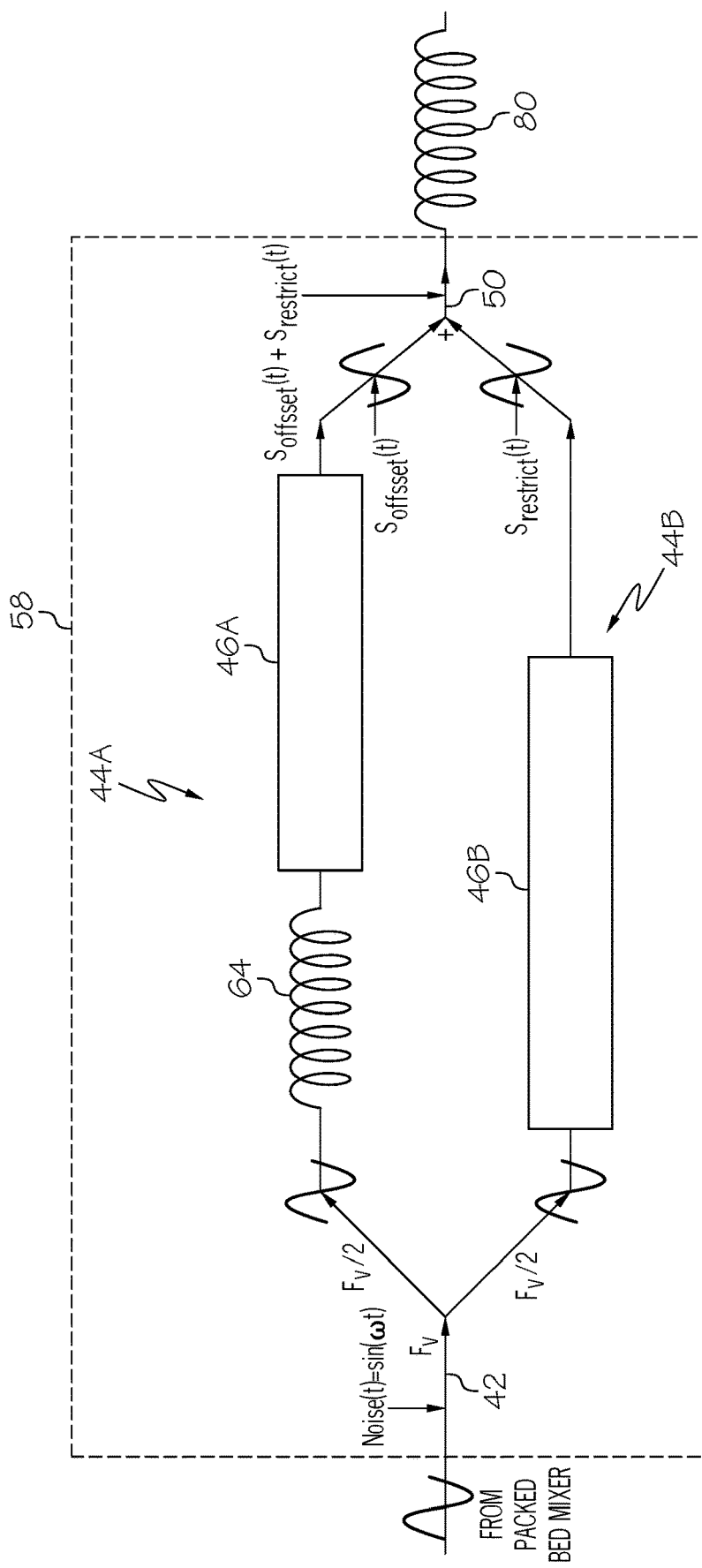
FIG. 11 is a schematic representation of another embodiment of a split flow mixer having a coil channel offset volume.

The third configuration was similar to the second configuration, but also included the additional components shown in FIG. 11. More specifically, the output of the packed bed mixer was fluidically coupled to an inlet 42 of a split flow mixer 58 and the mixer outlet was fluidically coupled to a coiled tube 80. The split flow mixer 58 is similar to that shown in FIG. 8; however, the volume of the coiled channel 64 having a 0.250 in. coil diameter is 12.5 µL to target the frequency associated with the 50 µL pump stroke volume noise. The second coiled channel 80 having a 0.370 in. coil diameter of is used to better recombine the two merged flows exiting the split flow mixer 58 (i.e., enable a better superposition of the two waveforms present at the mixer output 50) by substantially increasing radial mixing. The result is shown in plot 74 of FIG. 10 in which a near complete elimination of the periodic noise evident in plot 72 is accomplished.

Figure 12:
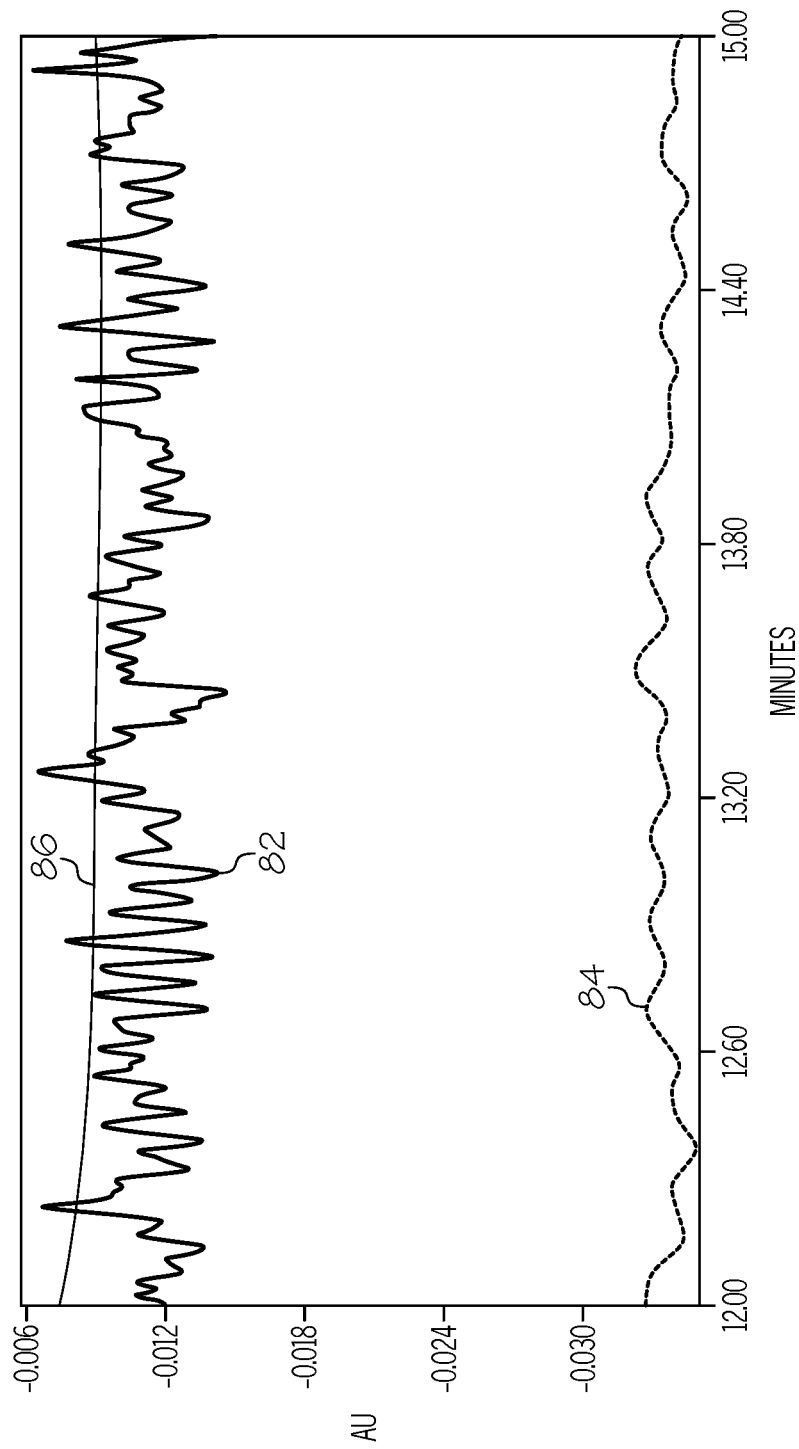
FIG. 12 is a graphical representation of the detector signal for the same three configurations for the liquid chromatography system associated with FIG. 10 except for a difference in the composition of the combined solvent flow.

FIG. 12 shows a graphical representation of the detector signal for the evaluated system for the same three configurations and operational parameters used for the measurements associated with FIG. 10 with one difference: The combined solvent flow was 95% acetonitrile plus 0.1% TFA and 5% water plus 0.1% TFA.

Plot 82 indicates the signal for the configuration without any mixer where significant noise from the two pumps is observed. Plot 84 represents the second configuration with a periodic noise similar to that seen in plot 72 of FIG. 10. Plot 86 corresponds to the third configuration and shows near complete cancellation of the periodic noise in plot 84. Thus, the noise reduction improvement achieved for the second and third configurations appears to be independent of the solvent composition.

Figure 13A:
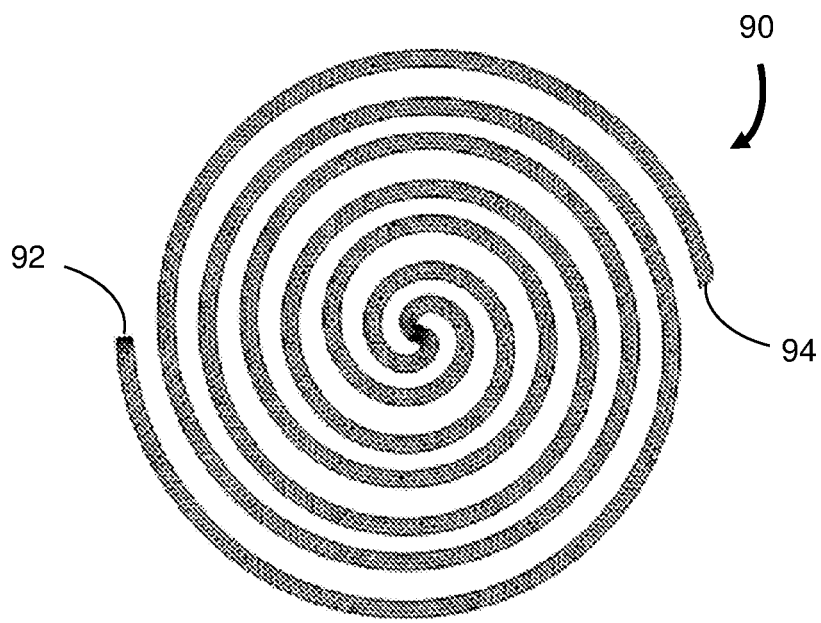
FIG. 13A shows a coiled channel formed as a single spiral channel.

In some implementations, the coiled channel is provided as one or more two-dimensional coils, that is, one or more flat coils or spiral channels. FIG. 13A shows a single spiral channel 90 in which the solvent flow is received at an inlet 92 and exits the spiral channel 90 at an outlet 94. The solvent flow experiences the centrifugal force due to the curvature of the flow channel in flowing in a counterclockwise direction flowing toward the center of the spiral where the flow then continues by flowing away from the center in a counterclockwise direction until exiting at the outlet 94.

Figure 13B:
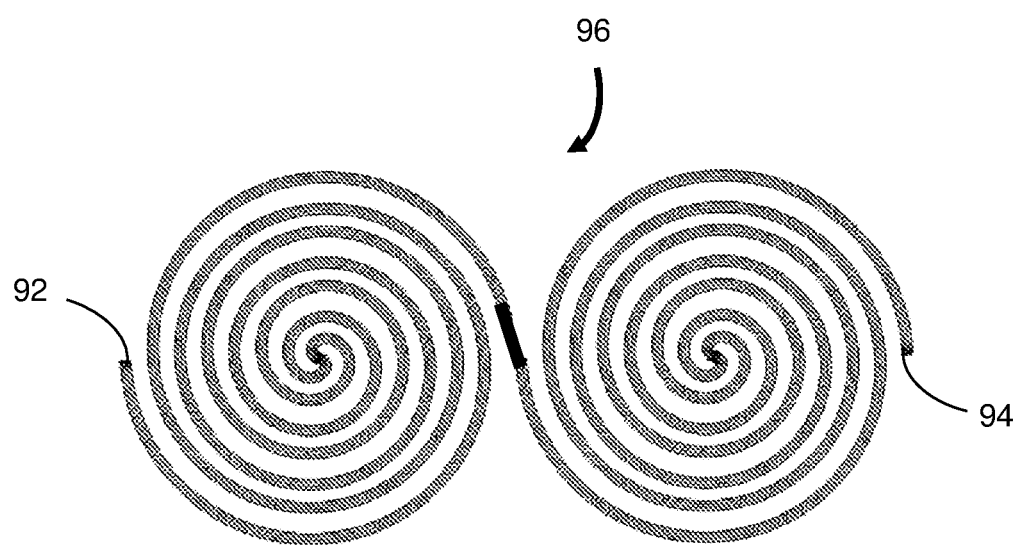
FIG. 13B shows a coiled channel formed as a serial arrangement of two spiral channels.
Figure 13C:
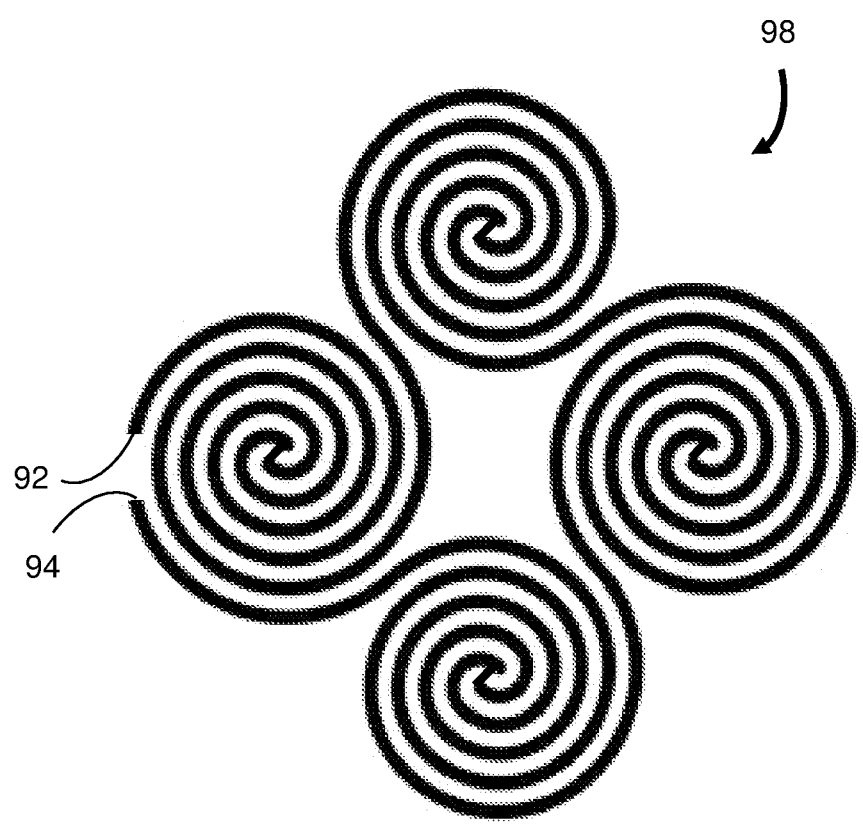
FIG. 13C shows a coiled channel formed as a serial arrangement of four spiral channels.

In some instances, the desired flow path may be too long to be accommodated by a single spiral channel. FIG. 13B shows an alternative spiral channel arrangement 96 in which two spiral channels are arranged serially. Thus, the longer total path length of the two spiral channels can occupy a smaller area than if the same flow path were to be implemented in a single spiral channel. Similarly, FIG. 13C shows another alternative spiral channel arrangement 98 in which four spiral channels are arranged serially. Other spiral channel arrangements are contemplated, including implementations of one or more spiral channels in multiple planes such that a composite structure that includes all the channels is realized in a three-dimensional configuration occupying a small volume, such as in stacked substrates or in different layers of a diffusion-bonded structure.

As described above, a curved channel is used to increase the radial dispersion while decreasing the axial dispersion with respect to a straight channel. In the embodiments discussed above, an offset volume of a split flow mixer is implemented as a coiled channel to improve the performance of prior split flow mixers having straight path implementations of the offset volume. The same principle can be applied to configure the fluid paths of a differential scanning calorimeter (DSC).

Figure 14:
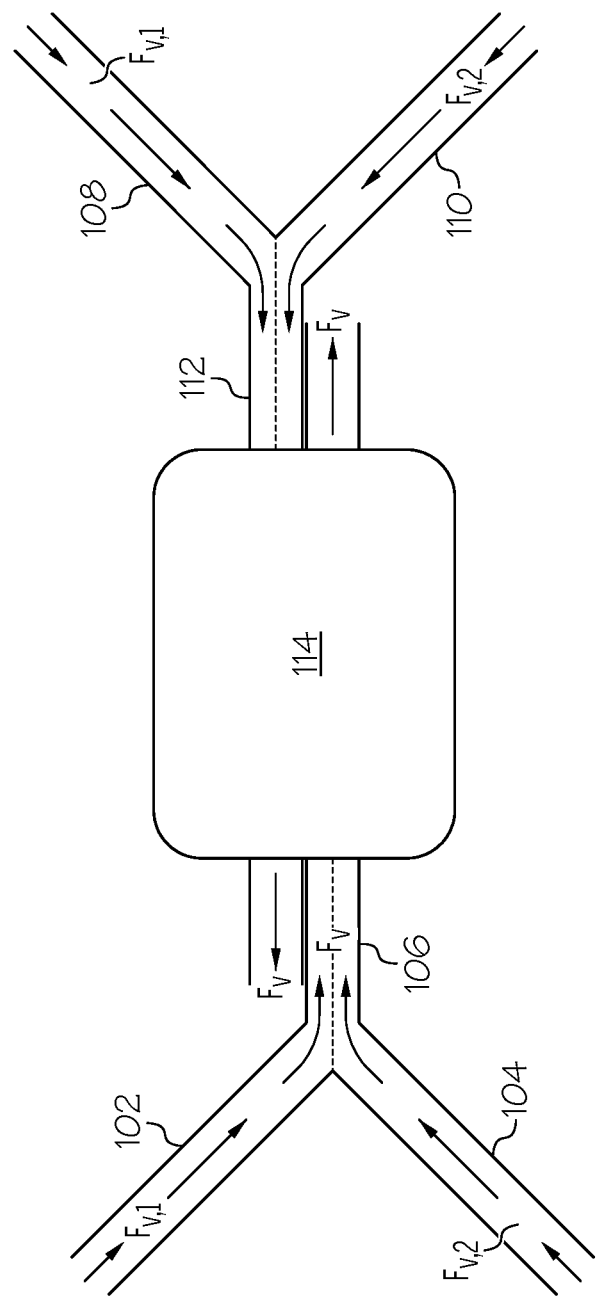
FIG. 14 is an illustration of a configuration of flow channels that may be used in a differential scanning calorimeter to increase measurement sensitivity.

FIG. 14 illustrates a configuration of flow channels that may be used in a DSC to increase the sensitivity for the measurement of binding constants between two chemicals such as proteins and antibodies. Two parallel incoming solvent channels 102 and 104 are merged and mix the solvents along a coiled tube 106. Similarly, a second pair of incoming solvent channels 108 and 110 are merged and mix in a second coiled tube 112. For example, the coiled tubes 106 and 112 may be 1.5 μL volume copper tubes having a length of approximately 20 in. and an inner diameter of 0.0025 in. Although each path 106 or 112 of the combined flows is schematically depicted as horizontal, each is shaped as a spiral or the two paths 106 and 112 may be formed as a double helix to thereby reduce the footprint and increase the heat flow per unit volume. In a non-limiting numerical example, the two reagents ($D_m$=5×10−7 cm2/s) solvents (water) at a flow rate of 30 μL/min generate $Dn^2Sc$=5,000, ensuring efficient radial mixing and reaction between the chemicals. The particular geometry of the coiled tubes 106 and 112 can be optimized for the released heat flow. The result is an increased heat density due to the reduced footprint and an increase in measurement sensitivity. In cell 114, radial mixing operates and bring the reactants in contact for the binding reaction which is either endo-thermic or exo-thermic. The heat from the reaction is detected by a thermocouple or other means of heat detection.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A mixer for a chromatography system comprising:
   an inlet configured to receive a fluid flow;
   an outlet configured to provide the fluid flow;
   a first flow channel coupled between the inlet and the outlet; and
   a second flow channel coupled between the inlet and the outlet, wherein the second flow channel includes an offset volume configured to delay fluid propagation through the second flow channel relative to the first flow channel, the offset volume comprising a coiled channel, wherein the coiled channel is wound, arranged in a spiral shape and/or in a sequence in interconnected rings and wherein a radial dispersion of a fluid flow through the coiled channel is increased.

2. The mixer of claim 1, wherein the inlet is configured to equally split the fluid flow between the first flow channel and the second flow channel.

3. The mixer of claim 1 wherein the coiled channel is a coiled tube.

4. The mixer of claim 3 wherein the coiled tube is formed as a helical coiled tube.

5. The mixer of claim 3 wherein the coiled channel is formed as a flat coil.

6. The mixer of claim 1 wherein the coiled channel comprises a plurality of serially coupled coiled channels.

7. The mixer of claim 6 wherein the serially coupled coiled channels are formed in a single plane.

8. The mixer of claim 1 wherein the coiled channel is formed in or on a surface of a substrate.

9. The mixer of claim 1 wherein the coiled channel is a first coiled channel, the mixer further comprising a second coiled channel fluidically coupled to the outlet of the mixer and wherein the second coiled channel increases a radial dispersion of the fluid flow from the outlet of the mixer.

10. A liquid chromatography system comprising:
    a mixer comprising:
       an inlet configured to receive a solvent flow having a composition of at least two solvents;
       an outlet configured to provide the solvent flow;
       a first flow channel coupled between the inlet and the outlet; and
       a second flow channel coupled between the inlet and the outlet, wherein the second flow channel includes an offset volume configured to delay solvent propagation through the second flow channel relative to the first flow channel, the offset volume comprising a coiled channel, wherein the coiled channel is wound, arranged in a spiral shape and/or in a sequence in interconnected rings and wherein a radial dispersion of the solvent flow through the coiled channel is increased;
    an injector configured to receive the solvent flow from the mixer and to inject a sample into the solvent flow; and
    a chromatography column in fluid communication with the injector for performing a separation of the sample.

11. The liquid chromatography system of claim 10 further comprising a pump in fluid communication with the inlet of the mixer to provide the solvent flow thereto.

12. The liquid chromatography system of claim 11 further comprising a gradient proportioning valve to provide the solvent flow to the pump.

13. The liquid chromatography system of claim 10 further comprising:
    a first pump to provide a flow of a first solvent;
    a second pump to provide a flow of a second solvent; and
    a fluidic tee having a first inlet in fluid communication with the first pump, a second inlet in fluid communication with the second pump, and an outlet in fluid communication with the inlet of the mixer to provide the solvent flow thereto.

* * * * *